United States Patent

[11] 3,618,052

[72] Inventors Thomas Kwei
Wappingers Falls;
Robert M. Meade, Wassaic, both of N.Y.
[21] Appl. No. 882,623
[22] Filed Dec. 5, 1969
[45] Patented Nov. 2, 1971
[73] Assignee Cogar Corporation
Utica, N.Y.

[54] BISTABLE MEMORY WITH PREDETERMINED TURN-ON STATE
31 Claims, 4 Drawing Figs.

[52] U.S. Cl. 340/173FF, 307/291, 340/173 SP
[51] Int. Cl. G11c11/40, G11c 11/48
[50] Field of Search 340/173 PE, 173 FF, 173 LS, 173 SP; 307/291

[56] References Cited
UNITED STATES PATENTS

| | | | |
|---|---|---|---|
| 3,529,299 | 9/1970 | Chung | 340/173 FF |
| 3,041,477 | 6/1962 | Budts | 307/291 X |
| 3,427,598 | 2/1969 | Kubinec | 340/173 FF |
| 3,531,778 | 9/1970 | Gardner | 340/173 LS |

OTHER REFERENCES
Wiedmann, Monolithic Memory Cell, 8/68, IBM Technical Disclosure Bulletin, Vol. 11, No. 3, 340- 173 LS

*Primary Examiner*—Bernard Konick
*Assistant Examiner*—Stuart Hecker
*Attorney*—Harry M. Weiss ABSTRACT: This disclosure relates to a semiconductor memory arrangement wherein data is preset in a memory array so that there is no need for a supplementary memory, such as a read-only memory, to store the data to be preset. Each memory cell of the semiconductor memory array is predisposed to assume a specific information state upon each application of power thereto. By biasing memory cells in this manner, the desired information is available either upon initial operation or upon the restoration of power subsequent to any power lapse or upon a desired program reset. Hence, a semiconductor memory array is provided which is operable as a Read-Only memory and yet can also function as a Read/Write memory. By writing information into the cells of the array regardless of the initial information state thereof, a Read/Write memory operation is superimposed onto a functioning Read-Only memory.

INVENTORS
THOMAS KWEI
ROBERT M. MEADE
BY Harry M Weiss
ATTORNEY

BISTABLE MEMORY WITH PREDETERMINED TURN-ON STATE

BACKGROUND OF THE INVENTION

1. Field of the Invention

This invention relates generally to semiconductor memories, which are programmed to an initial state and which have the features of a noneraseable data base and can be operated as a read-only or read/write memory.

2. Description of the Prior Art

In the past, semiconductor memories have had a serious drawback in that the information stored therein was lost when for any reason the power supply lapsed. This drawback however, was alleviated in the past by storing the desired initial data base in a secondary read-only or nonvolatile backup memory. Hence, the prior art technique required the use of at least two memories. The secondary memory device that was utilized to store this initial information had to, itself, be capable of retaining the information it stored when the power lapsed.

Auxiliary logic was required in the prior art technique of providing a backup read only or nonvolatile memory. This technique required the utilization of additional hardware and software and resulted in a relatively expensive system.

Hence, a need existed for a semiconductor memory which would assume a particular information state upon the application of power thereto, without the utilization of auxiliary logic systems or supplementary memories for storing the initial data. It was also desirable to have a memory cell design which included the feature of individualization of an initial data pattern in accordance with its system application while maintaining substantial standardization of manufacturing.

SUMMARY OF THE INVENTION

Accordingly, it is an object of this invention to provide an improved semiconductor memory arrangement which is preset to a predetermined data base upon the application of power thereto, or upon application of a reset command.

It is a further object of this invention to provide a semiconductor memory arrangement that reestablishes its initial data base upon the application of power thereto without requiring a supplementary memory.

It is still a further object of this invention to provide an improved semiconductor memory with a noneraseable data base.

It is another object of this invention to provide an improved semiconductor memory with a noneraseable data base which features are wholly contained within a monolithic semiconductor chip.

It is still another object of this invention to provide a semiconductor memory which may be mass-produced and personalized to an initial preset condition at the final stages of its manufacturing process.

It is a still further object of this invention to provide monolithic memory cells that provide the features of a semiconductor memory having a noneraseable data base.

DESCRIPTION OF THE PREFERRED EMBODIMENTS

In accordance with one embodiment of this invention, a semiconductor memory array comprises multiemitter, bistable memory cells. One of the emitters for each memory cell can be connected to a preset signal line for presetting the memory cell. The memory array is personalized to a desired data pattern by making the desired connections.

In accordance with another embodiment of this invention, each multiemitter, bistable memory cell of a semiconductor memory is designed with an unbalance to insure that it will always assume a particular initial state when power is applied. The memory array is personalized by connecting a selected one of the two sense lines for each cell.

In accordance with yet another embodiment of this invention, each bistable multiemitter memory cell of a semiconductor memory is provided with two collector resistor circuits having intermediate taps. The collector power supply is connected to one of the two intermediate taps thus effectively making one collector resistor greater than the other. This creates an unbalance to insure that the memory cell assumes its preset state when power is applied.

The foregoing, and other objects, features and advantages of the invention will be apparent from the following, more particular description of the preferred embodiments of the invention, as illustrated in the accompanying drawings.

BRIEF DESCRIPTION OF THE FIGURES

Referring to FIG. 1, a semiconductor memory 10 in accordance with one embodiment of this invention, comprises memory cells 12A, 12B and 12C. A work drive signal is connected to each of the memory cells through a word drive line 14 to operate the memory 10. Each memory cell is read through bit sense lines 16A, 16B, 16C and 18A, 18B, 18C. A preset signal voltage is connected to the memory cells through preset line 20 and presets each memory cell to either a "zero" state through lines 22A, 22B, 22C or a "one" state through lines 24A, 24B, 24C in accordance with the desired initial data pattern. Thus, for example, if it is desired to preset memory cells 12A and 12B to their "zero" state and memory cell 12C to its "one" state, the connection in lines 22A, 22B and 24C would be completed by electrically closing the gap in these lines.

In FIG. 1, three memory cells have been shown for illustrative purposes only. However, any number of memory cells may be provided to make up the memory array 10.

In writing, pulses are simultaneously applied to the word drive line 14 and the desired bit sense line. In reading, a pulse is applied to the word drive line 14 and read by the sense line.

Figure 1:
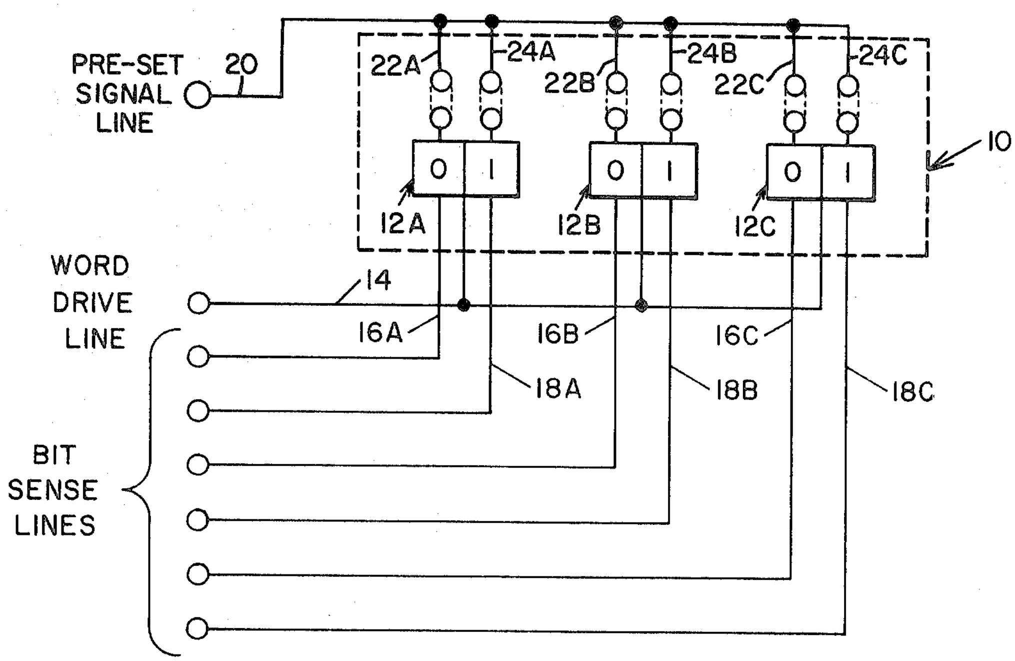
FIG. 1 is a block diagram depicting a semiconductor memory array in accordance with an embodiment of this invention.
Figure 2:
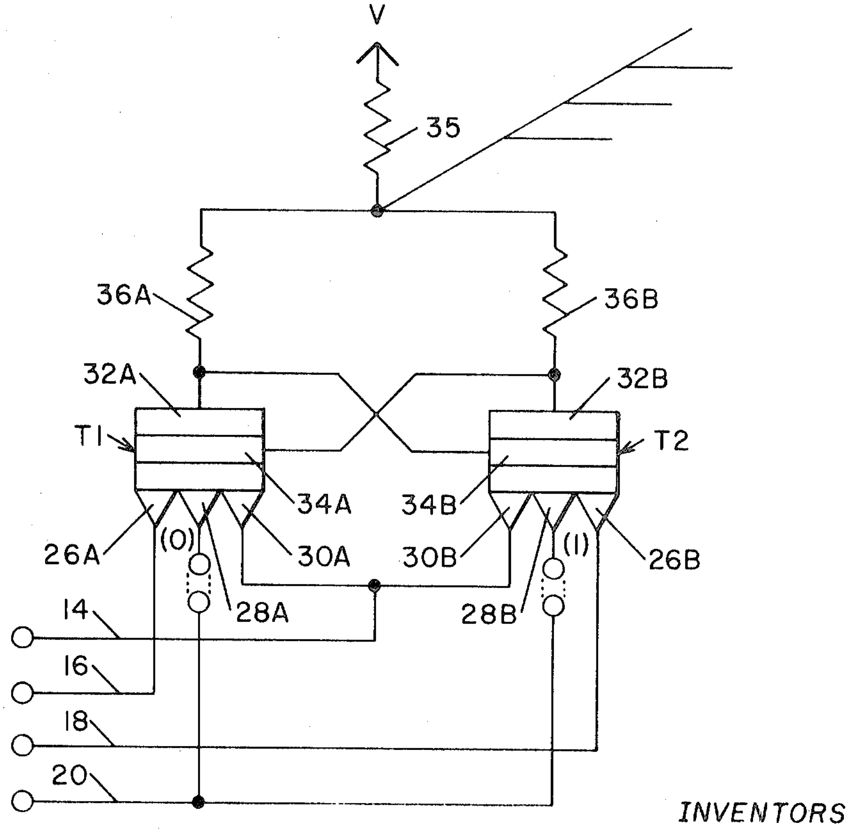
FIG. 2 is a schematic drawing of a typical memory cell used in FIG. 1.

Each of the memory cells 12 in the semiconductor memory array 10 is shown schematically in FIG. 2. Referring to FIG. 2, the memory cell is comprised of two transistors T1 and T2 and each transistor preferably consists of a common collector, a common base, and three emitters. The common collector 32A of transistor T1 is connected to the common base 34B of transistor T2, and the common base 34A of transistor T1 is connected to the common collector 32B of transistor T2 such that the transistors are connected up as a bistable memory cell. The common collector 32A is connected to one side of a resistor 35 through a resistor 36A and the common collector 32B is connected to the same side of the resistor 35 through a resistor 36B. The power supply V is connected to the memory cell through the resistor 35. The word drive line 14 is connected to emitters 30A and 30B, the bit sense line 16 for the "-zero" side of the memory cell is connected to emitter 26A and the bit sense line 18 for the "one" side of the memory cell is connected to emitter 26B. For a read operation, the word drive signal is of a magnitude sufficient to bring the emitters 30A and 30B to a higher voltage than the voltage at the emitters 26A and 26B in the absence of a bit signal. For a write operation, each of the bit signals is of a magnitude sufficient to bring the emitter 26A or 26B to approximately the same voltage as the emitters 30A and 30B during the presence of the word drive signal. When the memory cell is not selected, i.e., when there is no word drive signal, the quiescent voltage connected through the word drive line 14 is such that the emitters 30A and 30B assume a voltage lower than that appearing at the emitters 26A, 26B, and 28A, 28B.

The present line 20 for presetting the desired data is connected to the memory cell through either the emitter 28A or the emitter 28B in order to preset either a "one" or a "zero"

into the memory cell. The preset signal has a voltage magnitude sufficiently low to drive the emitter 28A or 28B to a voltage lower than that appearing at emitters 26A, 26B, 30A, 30B. In the absence of the preset signal, the voltage at the emitter 28A or 28B connected to the preset line 20 is higher than that at the emitters 26A, 26B, 30A, 30B. The preset signal may be obtained, for example, from the output of a monostable multivibrator which is triggered upon the application of power to the memory array.

In one example, wherein the memory array contained three memory cells, the supply voltage V is 4 volts, the resistance 35 is 1.6 kilohms and the collector resistors 36A and 36B are each 500 ohms. The voltage connected to the emitters 30A and 30B through the word drive line 14 is 2.4 volts during a word drive signal and 1 volt during quiesence. The write signals connected through lines 16 and 18 are each 2.4 volts and the quiescent voltage at the emitters 26A and 26B is 1.4 volts. The preset signal is at ground potential and the quiescent voltage at the emitter 28A or 28B connected to the preset line 20 is 3.2 volts. If a different number of memory cells are used in the memory array, the load across the voltage V would differ and it may be desirable to redesign the value of the resistance 35 to compensate for such a load change.

In operation, the preset signal is connected through line 20 to either emitter 28A or 28B, depending upon the desired data pattern. Assuming it is desired to preset the memory cell shown in FIG. 2 to a "one" state, i.e., emitter 26B conducting so that a signal will appear on bit sense line 18, the preset signal is connected through line 20 to the emitter 28B and the connection between line 20 and the emitter 28A is left open. Upon application of the power to the memory, the preset signal appears at the emitter 28B and forces emitter 28B into conduction. This conduction of emitter 28B causes the common collector 32B of transistor T2 to drop in voltage thereby reducing current to the common base 34A of transistor T1 such that none of the emitters in the transistor T1 conducts. Because none of the emitters in transistor T1 is conducting, the voltage in their common collector 32A remains sufficiently high to drive the emitters in transistor T2 through their common base 34B, and thereby causes emitter 30B to conduct, through the word drive line 14, after the preset signal is removed. The continued conduction of an emitter of transistor T2, i.e., emitter 30B, maintains the low voltage at the common collector 32B and the desired information state of the memory cell. In this manner, upon the application of the voltage and the preset signal, transistor T2 always assumes the conducting state, and transistor T1 always assumes the nonconducting state, as desired. If it were desired to have preset the memory cell to the "zero" state, i.e., transistor T2 cut off and transistor T1 conducting, the preset line 20 would have been connected to the emitter 28A and the connection between line 20 and the emitter 28B would have been left open.

The appearance of the word drive signal cuts off the conduction through emitter 30B whereby emitter 26B conducts through the bit sense line 18 and the state of the memory cell remains constant. During a read signal, this conduction is sensed.

If now a "zero" is to be written into the memory cell, i.e., the state opposite that preset therein, a write signal appears at the emitter 26B, through the bit sense line 18, thereby decreasing the conduction through emitter 26B and causing increased current to flow into the common base 34A of transistor T1. This base current causes emitter 26A to conduct and current flows through the bit sense line 16. The conduction of emitter 26A causes the voltage at the common base 34B to be sufficiently low to cut off all conduction through transistor T2. In this manner, the state of the memory cell is switched and transistor T1 will remain in conduction and transistor T2 will remain cut off when the voltage at the emitter 26B returns to its quiescent state after the write signal is removed. If a "one" was to have been written into the cell, the write signal would have been written into the cell, the write signal would have appeared through bit sense line 16 at the emitter 26A. Because emitter 26A was then already cut off, the write signal would not have caused the memory cell to have switched and the memory cell would have remained in the preset "one" state.

Either open shown in the line from emitter 28A or 28B to line 20 is created either by providing an opening in the metallization or conductor pattern (by using a suitable mask) or by failing to make electrical contact to the emitter that is not to be connected to line 20 (leaving the emitter contact hole closed). The latter is preferred since it permits a greater degree of flexibility in metallization.

Figure 3:
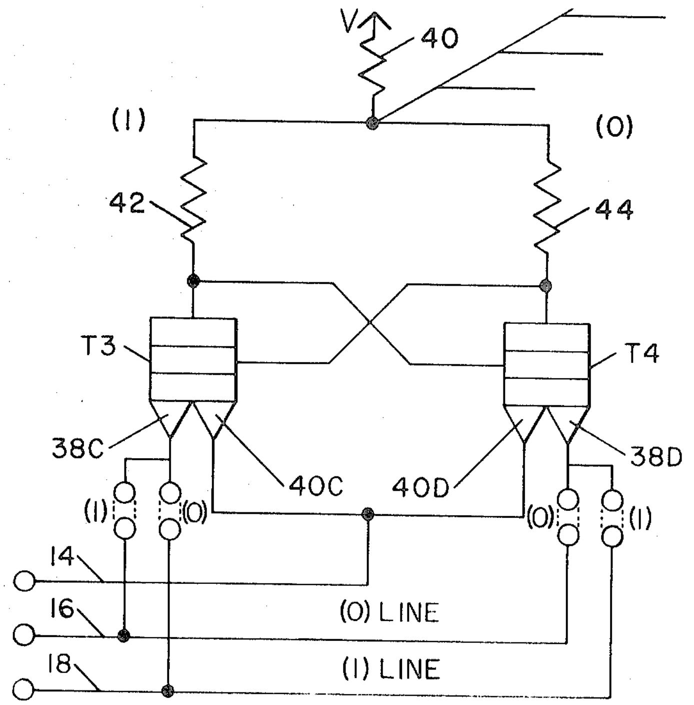
FIG. 3 is a schematic drawing of another memory cell in accordance with a second embodiment of this invention.

In the embodiment shown in FIG. 3 a memory cell is utilized comprising two transistors T3 and T4, each transistor having a common collector, common base, and two emitters. The transistors T3 and T4 are connected up as a bistable memory cell and to a word drive line 14 through the emitters 40C and 40D. The bias is provided by selecting different resistor values for the resistors 42 and 44, connected to the collector of transistors T3 and T4, respectively, and thus insuring that the desired transistor will assume and maintain the conducting state upon the application of power. Thus, for example, if resistor 42 is 500 ohms and resistor 44 is 600 ohms, the transistor T4 will always assume and maintain a conducting state upon the application of power, and transistor T3 will always assume the nonconducting state upon the application of power. This occurs because the smaller resistor 42 causes more current to flow into the base of transistor T4 upon the application of power and therefore drives it into conduction and cuts off transistor T3. During the last stage of manufacture, the bit sense lines 16 and 18 are connected to the desired emitter in accordance with the desired data pattern for the bit. For example, if current flows through bit sense line 18 when the memory cell is in a "one" state, and it is desired to preset the bit to a "one," bit sense line 18 is connected to the transistor T4 with the higher collector resistor and bit sense line 16 is connected to the transistor T3. In writing a "one," simultaneous pulses are applied to lines 14 and 16. In writing a "zero," simultaneous pulses are applied to lines 14 and 18. In reading, a pulse is applied to line 14 and sensed at line 16 or 18. The presetting of a "one" in the cell of FIG. 3 is accomplished by electrically closing the line between emitter 38C to line 16, and the line between emitter 38D and line 18. The presetting of a "zero" is accomplished by closing the other two lines connected between emitters 38C, 38D and lines 18 and 16, respectively.

Figure 4:
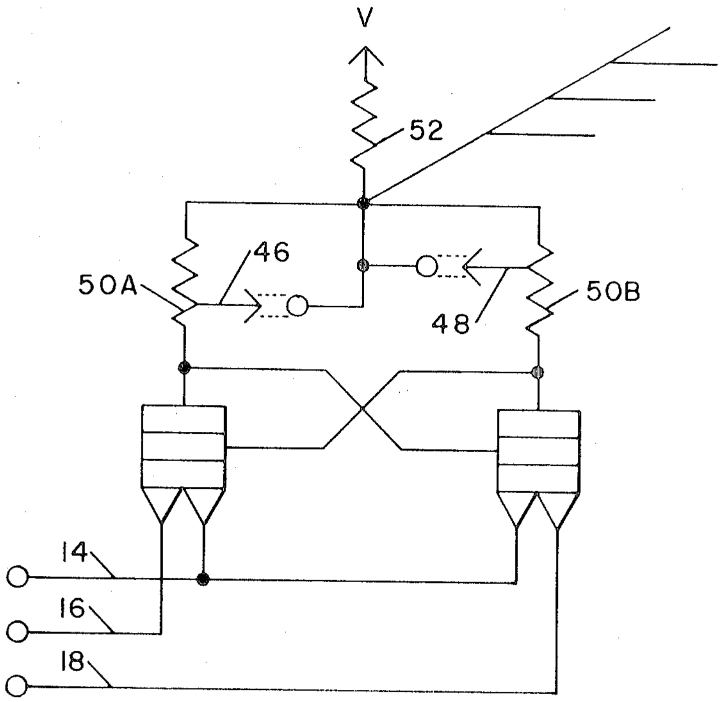
FIG. 4 is a schematic drawing of another memory cell in accordance with a third embodiment of this invention.

The embodiment shown in FIG. 4 is similar to that shown in FIG. 3 except that a tap 46 is connected to collector resistor 50A and a tap 48 is connected to resistor 50B. Bias personalization is achieved by connecting to collector power supply resistor 52 either tap 46 or 48 so as to short circuit a portion of either collector resistor 50A or 50B, respectively, and thereby reduce the effective resistance of the resistor having a portion thereof so short circuited. The read and write operations for the memory cell of this figure are similar to those of FIG. 3.

While the embodiments shown depict bipolar semiconductor devices, it is evident that the subject invention can be utilized with FET-type devices as well. Accordingly, the claims of this invention are intended to cover both FET and bipolar memory cells and arrays.

While the invention has been particularly shown and described with reference to preferred embodiments thereof, it will be understood by those skilled in the art the foregoing and other changes in form and details may be made therein without departing from the spirit and scope of the invention.

What is claimed is:

1. A read-write semiconductor memory array comprising, in combination, a plurality of read-write semiconductor memory cells, each of said cells having a "one" state and a "zero" state;

means for selectively coupling and initially presetting one of said "one" and "zero" states into each of said read-write cells, each of said cells of said array having said preset state upon each restoration of electrical energy to the semiconductor memory array; and writing means for superimposing on and changing said preset state in each of said cells.

2. A read-write semiconductor memory array in accordance with claim 1 wherein said selectively coupling and initially presetting means comprises a preset signal line electrically connected to a selected portion of each memory cell defining one of said "one" and "zero" memory states.

3. A read-write semiconductor memory array in accordance with claim 1 wherein said selectively coupling and initially presetting means comprises a preset signal line electrically connected to a selected portion of each memory cell defining one of said "one" and "zero" memory states.

4. A read-write semiconductor memory array in accordance with claim 1 wherein said selectively coupling and initially presetting means comprises a power line electrically connected to a selected portion of each memory cell defining one of said "one" and "zero" memory states.

5. A read-write semiconductor memory array, comprising, in combination, a plurality of read-write semiconductor memory cells having a "one" state and a "zero" state;

means for selectively coupling and initially presetting one of said "one" and "zero" states into each of said cells;

means for writing information into said memory cells of said memory array; and means for reading information from said memory cells of said memory array having information.

6. A read-write semiconductor memory array in accordance with claim 5 wherein each of said cells comprise cross-coupled semiconductor devices.

7. A read-write semiconductor memory array in accordance with claim 6 wherein each of said semiconductor devices is a bipolar device.

8. A read-write semiconductor memory array in accordance with claim 5 wherein said selectively coupling and initially presetting means comprises a preset signal line electrically connected to a selected portion of each memory cell defining one of said "one" and "zero" memory states.

9. A read-write semiconductor memory array in accordance with claim 8 wherein each of said cells comprises cross-coupled multiemitter devices, said preset signal line is electrically connected to a selected one of said cross-coupled multiemitter devices of each memory cell.

10. A read-write semiconductor memory array in accordance with claim 9 wherein each of said cross-coupled multiemitter devices comprises a triple emitter transistor type device, said preset signal line is electrically connected to one emitter of said triple emitter transistor type device of one said cross-coupled device.

11. A read-write semiconductor memory array in accordance with claim 5 wherein said selectively coupling and initially presetting means comprises a pair of bit lines electrically connected to related portions of each memory cell defining one of said "one" and "zero" memory states.

12. A read-write semiconductor memory array in accordance with claim 11 wherein each of said cells comprise cross-coupled multiemitter devices, one of said pair of bit lines is electrically connected to one of said cross-coupled multiemitter devices defining one of said "one" and "zero" memory states, the other of said pair of bit lines is electrically connected to the other of said cross-coupled multiemitter devices defining the same one of said "one" or "zero" memory state.

13. A read-write semiconductor memory array in accordance with claim 12 wherein each of cross-coupled multiemitter devices comprises a double emitter transistor type device, each of said pair of bit lines being electrically connected to one emitter of each of said cross-coupled devices.

14. A read-write semiconductor memory array in accordance with claim 5 wherein said selectively coupling and initially presetting means comprises a powerline electrically connected to a selected portion of each memory cell defining one of said "one" and "zero" memory states.

15. A read-write semiconductor memory array in accordance with claim 14 wherein each of said cells comprises cross-coupled multiemitter devices, said power line is electrically connected to a resistor of each memory cell defining one of said "one" and "zero" memory states.

16. A read-write semiconductor memory array in accordance with claim 15 wherein said resistor is electrically connected to the common collector of one of said cross-coupled multiemitter devices.

17. A read-write semiconductor memory array in accordance with claim 16 wherein said power line is electrically connected as an intermediate tap to said resistor, each of said cross-coupled multiemitter devices comprises a double emitter transistor type device.

18. A read-write semiconductor memory cell comprising, in combination, a read-write semiconductor memory cell having a "one" state and a "zero" state;

means for selectively coupling and initially presetting one of said "one" and "zero" states in said cell; said cell having said preset state upon each restoration of electrical energy to the semiconductor memory cell; and writing means for superimposing on and changing said preset state in said cell.

19. A read-write semiconductor memory cell in accordance with claim 18 wherein said selectively coupling and initially presetting means comprises a preset signal line electrically connected to a selected portion of said memory cell defining one of said "one" and "zero" memory states.

20. A read-write semiconductor memory cell in accordance with claim 18 wherein said selectively coupling and initially presetting means comprises a pair of bit lines electrically connected to related portions of said memory cell defining one of said "one" and "zero" memory states.

21. A read-write semiconductor memory cell in accordance with claim 18 wherein said selectively coupling and initially presetting means comprises a power line electrically connected to a selected portion of said memory cell defining one of said "one" and "zero" memory states.

22. A read-write semiconductor memory cell comprising, in combination, a read-write semiconductor memory cell having a "one" state and a "zero" state;

means for selectively coupling and initially presetting one of said "one" and "zero" states in said cell;

means for writing information into said memory cell; and means for reading information from said memory cell of said memory array having information.

23. A read-write semiconductor memory cell in accordance with claim 22 wherein said cell comprises cross-coupled semiconductor devices.

24. A read-write semiconductor memory cell in accordance with claim 23 wherein each of said cross-coupled semiconductor devices is a bipolar device.

25. A read-write semiconductor memory cell in accordance with claim 23 wherein said cell comprises cross-coupled multiemitter devices, one of a pair of bit lines is electrically connected to one of said cross-coupled multiemitter devices defining one of said "one" and "zero" memory states, the other of said pair of bit lines is electrically connected to the other of said cross-coupled multiemitter devices defining the same one of said "one" or "zero" memory state.

26. A read-write semiconductor memory cell in accordance with claim 25 wherein each of said cross-coupled multiemitter devices comprises a double emitter transistor type device, each of said pair of bit lines being electrically connected to one emitter of each of said cross-coupled devices.

27. A read-write semiconductor memory cell in accordance with claim 23 wherein said cell comprises cross-coupled multiemitter devices, a preset signal line is electrically connected to a selected one of said cross-coupled multiemitter devices.

28. A read-write semiconductor memory cell in accordance with claim 27 wherein each of said cross-coupled multiemitter devices comprises a triple emitter transistor type device, said preset signal line is electrically connected to one emitter of said triple emitter transistor type device of one said cross-coupled devices.

29. A read-write semiconductor memory cell in accordance with claim 23 wherein said cell comprises cross-coupled multiemitter devices, a powerline is electrically connected to a resistor of each memory cell defining one of said "one" and "zero" memory states.

30. A read-write semiconductor memory array in accordance with claim 29 wherein said resistor is electrically connected to the common collector of one of said cross-coupled multiemitter devices.

31. A read-write semiconductor memory cell in accordance with claim 30 wherein said power line is electrically connected as an intermediate tap to said resistor, said cross-coupled multiemitter devices comprises a double emitter transistor type device.

* * * * *

UNITED STATES PATENT OFFICE
CERTIFICATE OF CORRECTION

Patent No. 3,618,052 Dated November 2, 1971

Inventor(s) Thomas Kwei, et al

It is certified that error appears in the above-identified patent and that said Letters Patent are hereby corrected as shown below:

Column 3, line 75, cancel "the write signal would have been written into the cell". Column 5, line 70, after "of" insert -- said -- .

Signed and sealed this 31st day of October 1972.

(SEAL)
Attest:

EDWARD M.FLETCHER,JR.
Attesting Officer

ROBERT GOTTSCHALK
Commissioner of Patents